United States Patent [19]

Gower

[11] Patent Number: 5,169,201
[45] Date of Patent: Dec. 8, 1992

[54] CLIP-ON TAILGATE PROTECTOR

[75] Inventor: Jerald Gower, Beaverton, Mich.

[73] Assignee: Durakon Industries, Lapeer, Mich.

[21] Appl. No.: 792,727

[22] Filed: Nov. 15, 1991

[51] Int. Cl.$^5$ .............................................. B62D 33/02
[52] U.S. Cl. .................................... 296/39.2; 296/57.1
[58] Field of Search ...................... 296/39.2, 57.1, 50, 296/39.1

[56] References Cited

U.S. PATENT DOCUMENTS

| | | | |
|---|---|---|---|
| 4,047,749 | 9/1977 | Lambitz et al. | 296/39 R |
| 4,111,481 | 9/1978 | Nix et al. | 296/39 R |
| 4,128,271 | 12/1978 | Gray | 296/39 R |
| 4,161,335 | 7/1979 | Nix et al. | 296/39 R |
| 4,181,349 | 1/1980 | Nix et al. | 296/39 R |
| 4,333,678 | 8/1982 | Munoz et al. | 296/39 R |
| 4,861,093 | 8/1989 | Chapman | 296/180.1 |
| 4,944,612 | 7/1990 | Abstetar et al. | 296/39.2 |
| 4,974,895 | 12/1990 | Davenport | 296/39.2 |
| 5,000,503 | 3/1991 | Bernatek | 296/39.2 |

*Primary Examiner*—Robert R. Song
*Attorney, Agent, or Firm*—Reising, Ethington, Barnard, Perry & Milton

[57] ABSTRACT

A pick-up truck tailgate protector assembly (10) includes a sheet-like plastic panel (44) having a plurality of corrugations (46) formed integrally therein. A plurality of curved appendages (56) extend from the lower extremity (42) of the panel (44) for resiliently engaging the lower pivoted edge (24) of a vehicular tailgate (20). The panel (44) includes an upper extremity (40) having an L-shaped bead (60) extending the length thereof. The bead (60) is fixedly captured in an extruded aluminum channel (62). The channel (62) includes an integral uncinate member (50) for covering the upper swinging edge (22) of the tailgate (20).

22 Claims, 2 Drawing Sheets

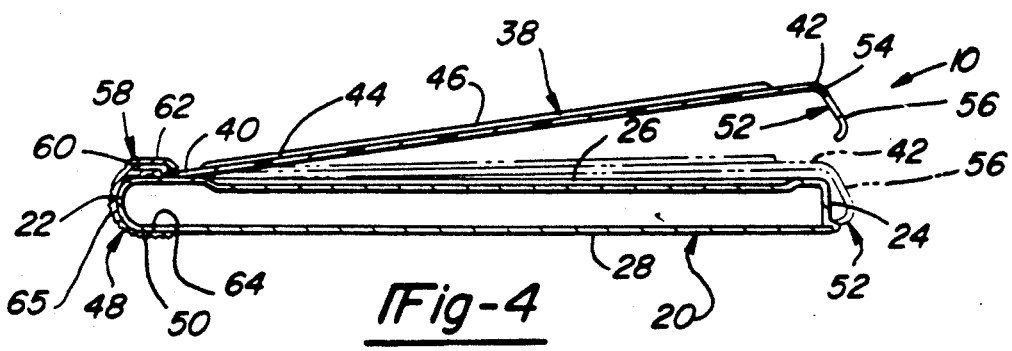
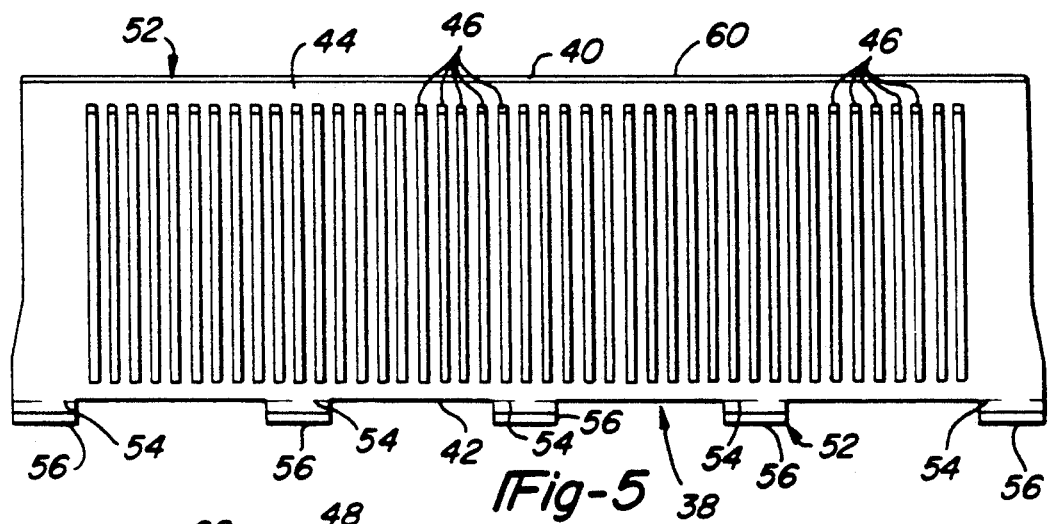
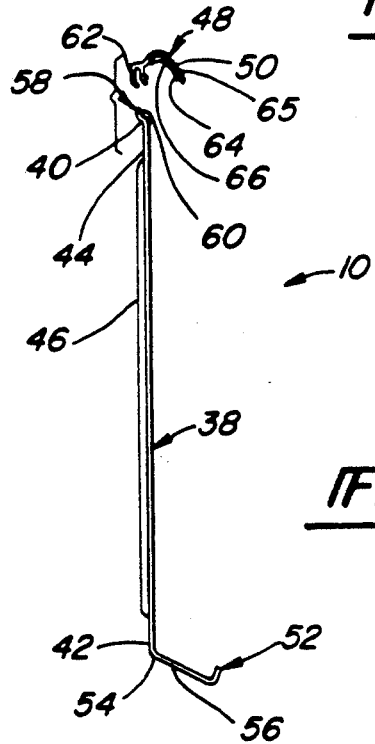

CLIP-ON TAILGATE PROTECTOR

TECHNICAL FIELD

The subject invention relates generally to vehicular tailgate protectors, and more particularly to a two-piece tailgate protector assembly which is retained on the tailgate under tension without the need for tailgate piercing fasteners.

BACKGROUND ART

The primary purpose for owning or leasing a pick-up truck is the ability to haul cargo within the bed of the pick-up truck. The prior art is replete with pick-up truck bed liner assemblies made of molded plastic which provide a durable, attractive, and functional wear surface over the cargo bed area. One example of such a prior art pick-up truck bed liner may be found in U. S. Pat. Reissue No. 32,198, reissued Jul. 8, 1986 and assigned to the assignee of the subject invention.

The tailgate members of such pick-up trucks are of generally uniform construction having a load bearing surface extending between parallel upper swinging and lower pivoted edges. The typical bed liner assembly does not cover the load bearing surface of the tailgate, even though the load bearing surface of the tailgate receives considerable wear due to the loading, unloading or shifting cargo when the tailgate is in both the up and down positions. Hence, a separate tailgate protector assembly is utilized in combination with the prior art truck bed liner to fully and completely protect both the cargo bed area of the pick-up truck and the tailgate.

One example of a prior art tailgate protector assembly is shown in U.S. Pat. No. 5,000,503 to Bernatek issued Mar. 19, 1991 and assigned to the assignee of the subject invention. The Bernatek reference discloses a tailgate protector assembly for protecting a vehicular tailgate having a load bearing surface extending between parallel upper swinging and lower pivoted edges. The assembly comprises a shield means for covering the load bearing surface of the tailgate and an integral guard means extending from the shield means for covering the upper swinging edge of the tailgate to provide a durable wear surface thereover. The assembly is secured to the tailgate by threaded fasteners extending through the shield means and piercing the tailgate.

Other examples of prior art tailgate protector assemblies similar to that disclosed in the Bernatek reference may be found in U. S. Pat. No. 4 047 749 to Lambitz et al issued Sept. 13, 1987, and U.S. Pat. No. 30 4 333 678 to Munoz et al issued Jun. 8, 1982. These references, like the Bernatik reference, also disclose tailgate protector assemblies including a shield means for covering the load bearing surface of a tailgate and some form of integral guard means extending from the shield means for covering the upper swinging edge of the tailgate to provide a durable wear surface thereover. These references both disclose threaded fasteners extending through the shield means and piercing the tailgate to anchor the tailgate protector assembly securely to the tailgate.

The U.S. Pat. No. 4,111,481 to Nix et al, issued Sept. 5, 1978, discloses a tailgate protector assembly including a shield means for covering the load bearing surface of a tailgate, and an integral guard means for covering the upper swinging edge of the tailgate to provide a durable wear surface thereover. A resilient retainer means extends from the shield means for engaging the lower pivoted edge of the tailgate in a clip-on manner to secure the assembly upon the tailgate.

Because the upper swinging edge of the tailgate forms a high impact area when long boards or other elongated cargo members are slid over and are supported on the upper swinging edge, the guard means is an indispensable element of the tailgate protector assembly. The guard means typically experiences highly accelerated wear which, in some instances, far exceeds the wear of the shield means.

One additional factor contributing to the accelerated wear of the guard means occurs when a camper top is installed over the bed area of the pick-up truck. Such camper tops typically include an access door disposed directly above the tailgate for providing access to the cargo bed area when the tailgate is in the up position. Frequent opening and closing of this access door on the camper top and vibration of the access door on the upper swinging edge of the tailgate significantly contribute to the accelerated wear of the guard means.

Of course, depending upon the particular uses to which the pick-up truck is put, the shield means may wear more rapidly than the guard means. Hence, the guard means may be in satisfactory useful service but because it is integral with the shield means, both are discarded together when the shield means wear out.

As a result, the entire tailgate protector assemblies of the prior art must be replaced when either one of the shield means or the guard means becomes cracked, worn through, or exceedingly unsightly. This is the case even though the shield means may not need replacing, or vice-versa. Thus, the prior art assemblies promote wasteful practices by requiring the whole tailgate protector assembly to be discarded when only a portion of the assembly, i.e., the guard means or the shield means, becomes worn out.

Another problem with the prior art tailgate assemblies arises because both the shield means and guard means are fabricated integrally from a thermoplastic molded plastic material which is inherently sensitive to sunlight. As a result, warpage of the assembly occurs, thus causing an unsightly, and in some instances nonfunctional, tailgate protector assembly.

SUMMARY OF THE INVENTION AND ADVANTAGES

The subject invention provides a tailgate protector assembly for protecting a vehicular tailgate having a load bearing surface extending between parallel upper swinging and lower pivoted edges. The assembly comprises a shield means for covering the load bearing surface of the tailgate, a retainer means extending from the shield means for engaging the lower pivoted edge of the tailgate and securely retaining the shield means relative to the lower pivoted edge, and a guard means extending from the shield means for covering the upper swinging edge of the tailgate to provide a durable wear surface thereover. The invention is characterized by including a disconnection means for releasibly coupling the shield means to the guard means to retain the assembly on the tailgate under tension between the guard means and the retainer means thereby permitting convenient replacement of the guard means on the shield means.

The disconnection means of the subject invention is particularly useful in permitting the guard means to be removed from the assembly for convenient replacement or repair, or in the alternative, by permitting a damaged shield means to be replaced with a new shield means while continuing to use the original guard means. Also, the disconnection means permits the guard means to be fabricated from a dissimilar material thereby increasing the available ascetic options of the tailgate protector assembly, and also enabling the guard means to be fabricated from a significantly more durable material, e.g., metal, than the shield means. And also, because the disconnection means permits the guard means to be fabricated from a dissimilar material relative to the shield means, the guard means is effective to prevent warpage of the shield means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional view as in FIG. 3 showing the tailgate protector assembly partially disposed on a tailgate in solid and moved toward the fully engaged position in phantom;

FIG. 5 is a front view of the shield means and retainer means; and

FIG. 6 is an exploded end view of the tailgate protector assembly.

DETAILED DESCRIPTION OF THE PREFERRED EMBODIMENT

Figure 1:
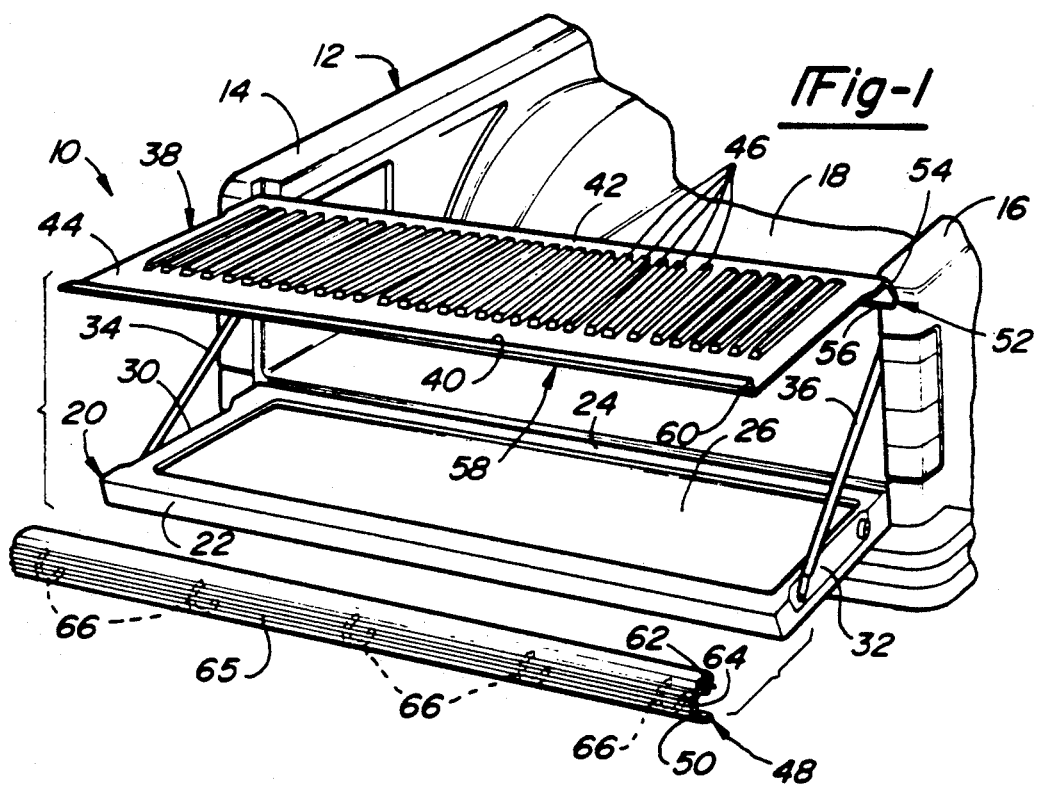
FIG. 1 is an exploded perspective view of a tailgate protector assembly according to the subject invention disposed for connection to a vehicular tailgate.
Figure 2:
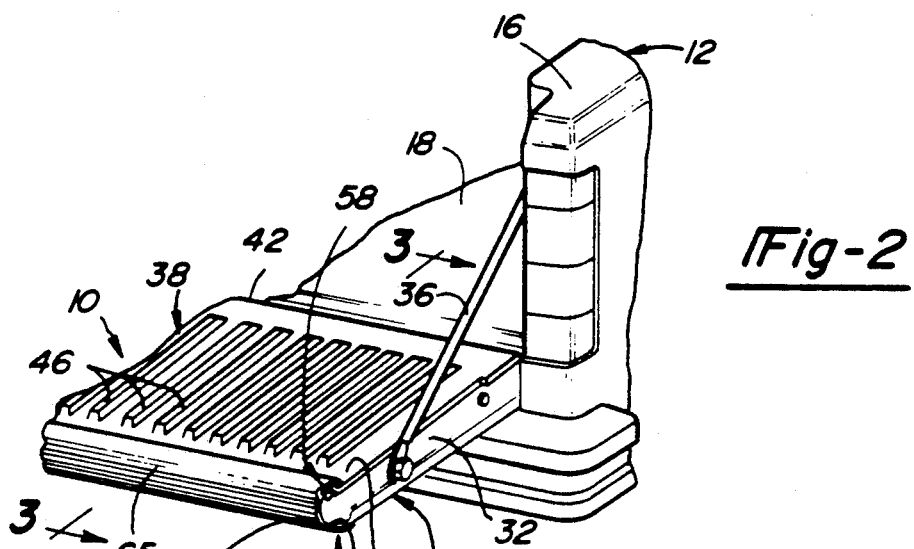
FIG. 2 is a fragmentary perspective view of the tailgate protector assembly disposed for operation on a tailgate.

Referring to the FIGS., wherein like numerals indicate like or corresponding parts throughout the several views, a tailgate protector assembly according to the subject invention is generally shown at 10. In FIG. 1, the bed portion of a typical pick-up truck is generally indicated at 12 and includes a pair of upright side walls 14, 16 extending upwardly from a floor portion 18. A tailgate, generally indicated at 20, is shown pivotally connected to the rearward end of the bed 12 and disposed in the open position in FIGS. 1 and 2. In typical fashion, the tailgate 20 is pivotal to a closed position (not shown) wherein the side walls 14, 16, tailgate 20 and a front bulkhead (not shown) form a box-like structure surrounding the floor portion 18.

The tailgate 20 includes an upper swinging edge 22 and a parallel lower pivoted edge 4. A load bearing surface 26 extends between the upper swinging 22 and lower pivoted 24 edges. The load bearing surface 26 faces inwardly toward the truck bed 12, i.e., in the forward direction of the vehicle, when the tailgate 20 is in the closed position, and faces upwardly when the tailgate 20 is in the open position. The tailgate 20 further includes an exterior surface 28 shown in the cross sectional views of FIGS. 3 and 4. A left side edge 30 and a right side edge 32 extend perpendicularly between the upper swinging 22 and lower pivoted 24 edges and define the crosswise boundaries of the tailgate 20. A flexible or pivoted left side strap 34 extends between the left side wall 14 of the bed 12 and the left side edge 30 of the tailgate 20. Likewise, a right side strap 36 extends between the right side wall 16 of the bed 12 and the right side edge 32 of the tailgate 20. The side straps 34, 36 support and brace the tailgate 20 when in the open position of FIG. 1, i.e., flat and substantially coplanar with the floor 18.

The tailgate protector assembly 10 includes a shield means, generally indicated at 38, for covering the load bearing surface 26 of the tailgate 20. The shield means 38 includes an upper extremity 40 and a lower extremity 42 extending parallel to the upper extremity 40. A sheet-like plastic panel 44 extends continuously between the upper 40 and lower 42 extremities to the define the shield means 38. Preferably, the panel 44 is fabricated from a thermoplastic resin such as polyethylene, polypropylene, ABS polymers, high-impact polystyrene, acrylics, etc. A plurality of rib-like corrugations 46 are integrally formed in the panel 44 to increase the rigidity of the tailgate protector assembly 10, reduce the coefficient of sliding friction thereover as heavy objects are slid into and out of the interior of the bed 12, and also to minimize warpage of the shield means 38 caused by exposure to sunlight. As perhaps best shown in FIGS. 1, 2 and 5, the corrugations 46 extend parallel to one another and perpendicularly between the upper 40 and lower 42 extremities. Therefore, when the tailgate 20 is disposed in the upright position (not shown), the corrugations 46 each extend in the vertical direction. Uncorrugated sections are created at the upper and lower terminal ends of the corrugations 46 and between the respective upper 40 and lower 42 extremities.

The tailgate protector assembly 10 further includes a guard means, generally indicated at 48, for covering the upper swinging edge 22 of the tailgate 20 to provide a durable wear surface thereover. More particularly, it will be readily appreciated that the upper swinging edge 22 forms a load bearing surface whenever elongated cargo items disposed in the bed 12 extend over the closed tailgate 20, or whenever the upper swinging edge 22 is used as a support element as cargo items are slid into the bed 12. In these instances, the guard means 48 provides the necessary protection for the upper swinging edge 22 of the tailgate 20 so that heavy cargo slid thereover and supported thereagainst do not cause damage directly to the tailgate 20.

The guard means 48 includes a rigid uncinate member 50 extending the length of the upper swinging edge 22 and adapted to wrap over, or hook around, the upper swinging edge 22 of the tailgate 20 so that a portion of the uncinate member 50 terminates on the exterior surface 28 of the tailgate 20. In the preferred embodiment illustrated in the FIGS., the guard means 48 is fabricated from a material which is dissimilar to the thermoplastic resin of the shield means 38. From both a functional and an aesthetic standpoint, an aluminum material has been found particularly suitable for the guard means 48. Hence, the uncinate member 50, when fabricated from aluminum, rigid and unbending.

Figure 3:
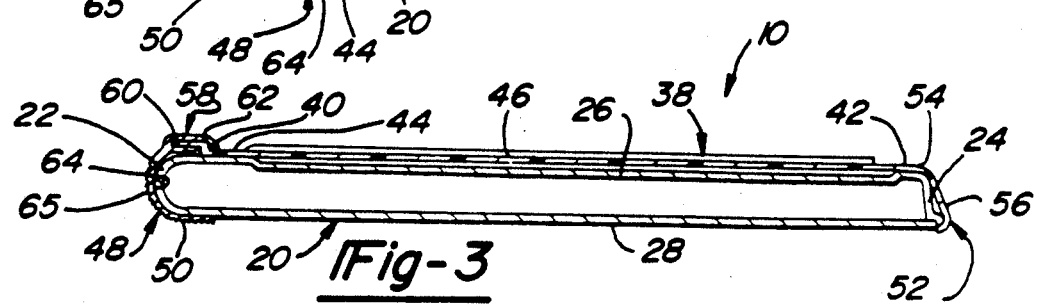
FIG. 3 is a cross-sectional view as taken along lines 3—3 of FIG. 2.

The tailgate protector assembly 10 further includes a retainer means, generally indicated at 52, extending from the shield means 38 for engaging the lower pivoted edge 24 of the tailgate 20 and securely retaining the shield means 38 relative to the lower pivoted edge 24. In this manner, the retainer means 52 functions to connect the shield means 38 to the lower pivoted edge 24 of the tailgate 20. As perhaps best shown in FIGS. 4 and 5, the retainer means 52 adjoins the shield means 38 along a resilient connecting portion 54. In FIG. 5, the retainer means 52 is shown including a plurality of curved appendages 56 spaced from one another along the lower extremity 42 of the panel 44. The curved appendages 56 have a generally J-shape as shown in FIGS. 3, 4 and 6, which extend obliquely and rearwardly from the panel 44. The appendages 56 are fabricated integrally with the shield means 38 such that the shield means 38 and retainer means 52 are molded simultaneously from the same thermoplastic resin. Preferably, five such appendages 56 are provided and equally spaced from one another along the length of the panel 44. In this manner, the flexible thermoplastic material adjoining the appendages 56 to the lower extremity 42 of the panel 44 forms the connecting portion 54 which permits the appendages 56 to flex and bend relative to the panel 44.

Both the uncinate member 50 of the guard means 48 and the appendages 56 of the retainer means 52 curve rearwardly from the panel 44 to securely grasp the upper swinging 22 and lower pivoted 24 edges of the tailgate 20 and thereby hold the panel 44 flat and tight against the load bearing surface 26 of the tailgate 20 without requiring fasteners extending through the panel 44 and piercing or otherwise anchoring themselves directly in the tailgate 20.

The tailgate protector assembly 10 also includes a disconnection means, generally indicated at 58, for releasibly coupling the shield means 38 to the guard means 48 to retain the assembly 10 on the tailgate 20 under tension between the guard means 48 and the retainer means 52 thereby permitting convenient replacement of the guard means 48 on the shield means 38. The disconnection means 58, therefore, permits the guard means 48 to be fabricated from a dissimilar material to the shield means 38, and then the two members later connected at a releasible connection permitting subsequent removal of the guard means 48 from the shield means 38.

The disconnection means 58 includes a bead 60 extending along the upper extremity 40 of the shield means 38. The bead 60, more specifically, comprises an L-shaped flange-like formation disposed along the upper extremity 40 and spaced from the corrugations 46. The bead 60 presents this L-shaped cross section continuously along the entire length of the upper extremity 40, as best shown in FIG. 1. The disconnection means 58 further includes a channel 62 disposed in the guard means 48 for securely receiving the bead 60. The channel 62 is formed integrally with and extends directly from the uncinate member 50 such that the guard means 48 comprises a one piece structure. As best shown in FIGS. 3 and 4, the bead 60 fits snugly within the channel 62 when slid longitudinally in from the side. However, the bead 60 and channel 62 will not disengage upon a lateral force so that when the tailgate protector assembly 10 is installed on the tailgate 20, the guard means 48 and shield means 38 will remain securely attached to one another.

Referring now to FIGS. 1 and 6, the uncinate member 50 is shown including a concave surface 64 which, in operation, is contiguous to the upper swinging edge 22 of the tailgate 20. A convex surface 65, opposite the concave surface 64, includes a plurality of parallel ridges extending the length of the uncinate member 50 for enhancing the grip or feel of the guard means 48 and for enhancing the aesthetic appearance of the guard means 48. A plurality of cellular elastomeric foam strips 66 are disposed on the concave surface 64 for enhancing frictional contact between the upper swinging edge 22 and the uncinate member 50. The foam strips 66 may be of the adhesive type and are disposed parallel to one another and spaced equally along the length of the uncinate member 50. As shown in FIG. 1, the foam strips 66 each extend generally perpendicular from the channel 62 and are thereby formed in a generally C-shape. As no fasteners are used to connect the channel 62 to the bead 60, the foam strips 66 engage the upper swinging edge 22 of the tailgate 20 and hold the entire guard means 48 immobile relative to the tailgate 20. And, because the shield means 38 is held securely to the tailgate 20 by the appendages 56, both the shield means 38 and guard means 48 remain fixed relative to one another.

The tailgate protector assembly 10 is easily installed on the tailgate 20 of a pick-up truck by first hooking the uncinate member 50 over the upper swinging edge 22 of the tailgate 20. This is best shown in the solid illustration of FIG. 4 whereby the guard means 48 fully seats over the upper swinging edge 22 thereby compressing the foam strips 66. The panel 44 is spaced angularly above the load bearing surface 26 of the tailgate 20 due to the appendages 56 being disposed above the lower pivoted edge 24. Next, the appendages 56 are manually deflected outwardly as shown in phantom in FIG. 4. Due to the resilient nature of the connecting portion 54, the appendages 56 are extended completely over and snapped or clipped around the lower pivoted edge 24 of the tailgate 20 as shown in FIG. 3, to securely retain the protector assembly 10 under a biasing tension onto the tailgate 20. That is, the flexible, elastic, spring-like nature of the connecting portion 54 and appendages 56 pulls the panel 44 away from the upper swinging edge 22. And, because the guard means 48 is snugly positioned over the upper swinging edge 22 with the disconnection means 58 securely retaining the guard means 48 to the shield means 38 in the lateral direction, a tensile force is established within the panel 44. This causes the tailgate protector assembly 10 to remain securely attached to the tailgate 20 thereby obviating the need for tailgate piercing or anchored fasteners.

The disconnection means 58 of the subject invention permits the guard means 48 to be fabricated from a material different than that of the shield means 38. As mentioned above, the guard means 48 is preferably fabricated from an extruded aluminum material, whereas the shield means 38 is fabricated from a molded thermoplastic resin. Because of the inherent sensitivity of the thermoplastic resin useful for truck bed liners and tailgate protector assemblies to solar rays, warpage of the prior art tailgate protector assemblies was common even in the portion covering the upper swinging edge of the tailgate. However, because the guard means 48 of the subject invention is fabricated from extruded aluminum which is essentially impervious to solar rays, the subject tailgate protector assembly 10 will not warp in the area of the upper swinging edge 22 of the tailgate 20, and the aluminum guard means 48 will function to restrain warpage of the shield means 38. Also, because the upper swinging edge 22 of the tailgate 20 comprises a high impact area, the guard means 48 is fabricated from a more durable material than the shield means 38 to withstand the increased loading. And, because the guard means 48 of the subject invention is fabricated from a material more durable than the remainder of the assembly 10, the abrasive action of a camper top access door against the guard means 48 will not result in premature failure of the entire tailgate protector assembly 10. Also, the extruded aluminum guard means 48 creates a decorative and aesthetically pleasing appearance which was not heretofore readily attainable in the prior art tailgate protector assemblies. Further, because the disconnection means 58 allows the guard means 48 to be removed from the shield means 38, a damaged or worn out guard means 48 (or shield means) may be readily replaced without requiring the shield means 38 and retainer means 52 (or guard means 48) from being replaced.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A tailgate protector assembly (10) for protecting a vehicular tailgate (20) having a load bearing surface (26) extending between parallel upper swinging (22) and lower pivoted (24) edges, said assembly (10) comprising: shield means (38) for covering the load bearing surface (26) of a tailgate (20); retainer means (52) extending from said shield means (38) for engaging the lower pivoted edge (24) of the tailgate (20) and securely retaining said shield means (38) relative to the lower pivoted edge (24); guard means (48) for covering the upper swinging edge (22) of the tailgate (20) to provide a durable wear surface thereover; and characterized by disconnection means (58) for releasibly coupling said shield means (38) to said guard means (48) to retain said assembly (10) on the tailgate (20) under tension between said guard means (48) and said retainer means (52) thereby permitting convenient replacement of said guard means (48) on said shield means (38).

2. An assembly as set forth in claim 1 wherein said shield means (38) includes an upper extremity (40) and a substantially parallel lower extremity (42), further characterized by said disconnection means (58) including a bead (60) extending along said upper extremity (40) of said shield means (38).

3. An assembly as set forth in claim 2 further characterized by said disconnection means (58) including a channel (62) disposed in said guard means (48) for securely receiving said bead (60).

4. An assembly as set forth in claim 3 further characterized by said guard means (48) including a rigid uncinate member (50) extending integrally from said channel (62).

5. An assembly as set forth in claim 4 further characterized by said uncinate member (50) being fabricated from a material dissimilar to said shield means (38).

6. An assembly as set forth in claim 2 further characterized by said retainer means (52) adjoining said shield means (38) along a resilient connecting portion (54).

7. An assembly as set forth in claim 6 further characterized by said retainer means (52) including at least one curved appendage extending from said lower extremity (42) of said shield means (38).

8. An assembly as set forth in claim 6 further characterized by said retainer means (52) including a plurality of curved appendages (56) spaced from one another along said lower extremity (42).

9. An assembly as set forth in claim 8 further characterized by said curved appendages (56) being fabricated integrally with said shield means (38).

10. An assembly as set forth in claim 2 further characterized by said shield means (38) including a sheet-like panel (44) extending continuously between said upper extremity (40) and said lower extremity (42).

11. An assembly as set forth in claim 10 further characterized by said panel (44) including a plurality of corrugations (46).

12. An assembly as set forth in claim 11 further characterized by said corrugations (46) extending parallel to one another and perpendicularly between said upper extremity (40) and said lower extremity (42).

13. An assembly as set forth in claim 12 further characterized by said bead (60) comprising a L-shaped formation disposed along said upper extremity (40) and spaced from said corrugations (46).

14. An assembly as set forth in claim 13 further characterized by said bead (60) having a continuous cross section along the entirety of said upper extremity (40).

15. An assembly as set forth in claim 4 wherein said uncinate member (50) includes a concave surface (64), further characterized by at least one cellular elastomeric foam strip (66) disposed on said concave surface (64).

16. An assembly as set forth in claim 15 further characterized by a plurality of said foam strips (66) spaced parallel from one another and extending perpendicular to said channels (62).

17. A tailgate protector assembly (10) for protecting a vehicular tailgate (20) having a load bearing surface (26) extending between parallel upper swinging (22) and lower pivoted (24) edges, said assembly (10) comprising:
shield means (38) for covering the load bearing surface (26) of a tailgate (20), said shield means (38) having an upper extremity (40) and a substantially parallel lower extremity (42);
an uncinate member (50) extending from said upper extremity (40) of said shield means (38) for covering the upper swinging edge (22) of the tailgate (20);
and characterized by a plurality of independently moveable curved appendages (56) extending from said lower extremity (42) of said shield means (38) for independently engaging the lower pivoted edge (24) of the tailgate (20).

18. An assembly as set forth in claim 17 further characterized by said appendages (56) each adjoining said shield means (38) along a respective resilient connecting portion (54) and being fabricated integrally with said shield means (38).

19. An assembly as set forth in claim 18 further characterized by said uncinate member (50) being fabricated from a material dissimilar to said shield means (38).

20. An assembly as set forth in claim 18 further characterized by said shield means (38) including a sheet-like panel (44) extending continuously between upper extremity (40) and aid lower extremity (42).

21. An assembly as set forth in claim 20 further characterized by said panel (44) including a plurality of corrugations (46).

22. An assembly as set forth in claim 21 further characterized by said corrugations (46) extending parallel to one another and perpendicularly between said upper extremity (40) and said lower extremity (42).

* * * * *